(12) United States Patent
Nagase

(10) Patent No.: US 8,706,408 B2
(45) Date of Patent: Apr. 22, 2014

(54) NAVIGATION SYSTEM AND ROUTE SEARCH METHOD

(75) Inventor: Kenji Nagase, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 815 days.

(21) Appl. No.: 12/733,894

(22) PCT Filed: Feb. 18, 2009

(86) PCT No.: PCT/JP2009/053307
§ 371 (c)(1),
(2), (4) Date: Mar. 26, 2010

(87) PCT Pub. No.: WO2009/113385
PCT Pub. Date: Sep. 17, 2009

(65) Prior Publication Data
US 2010/0228471 A1 Sep. 9, 2010

(30) Foreign Application Priority Data
Mar. 14, 2008 (JP) ................................ 2008-066455

(51) Int. Cl.
*G08G 1/123* (2006.01)

(52) U.S. Cl.
USPC ............................ 701/424; 701/414; 701/532

(58) Field of Classification Search
USPC ................................................ 701/414, 424
See application file for complete search history.

(56) References Cited

U.S. PATENT DOCUMENTS

| | | | |
|---|---|---|---|
| 4,550,317 A | 10/1985 | Moriyama et al. | |
| 5,892,463 A * | 4/1999 | Hikita et al. | 340/995.13 |
| 6,101,443 A * | 8/2000 | Kato et al. | 701/414 |
| 6,341,255 B1 * | 1/2002 | Lapidot | 701/420 |
| 6,351,707 B1 * | 2/2002 | Ichikawa | 701/428 |
| 7,355,528 B2 * | 4/2008 | Yamane et al. | 340/995.13 |
| 7,512,487 B1 * | 3/2009 | Golding et al. | 701/424 |
| 7,729,335 B2 * | 6/2010 | Lee et al. | 370/349 |
| 2002/0177950 A1 | 11/2002 | Davies | |
| 2006/0161334 A1 * | 7/2006 | Teramae | 701/117 |

(Continued)

FOREIGN PATENT DOCUMENTS

| | | |
|---|---|---|
| EP | 1 308 917 A1 | 5/2003 |
| EP | 1 596 163 A2 | 11/2005 |

(Continued)

OTHER PUBLICATIONS

International Search Report issued for International Application No. PCT/JP2009/053307 on Feb. 18, 2009.

(Continued)

*Primary Examiner* — Khoi Tran
*Assistant Examiner* — Robert Nguyen
(74) *Attorney, Agent, or Firm* — Oliff PLC

(57) ABSTRACT

When a destination is set, a CPU transmits to an information distribution center average vehicle speed information and so on together with a request command requesting for statistical traffic information. On the other hand, a CPU selects statistical traffic information per vehicle speed region of a predetermined vehicle speed region for each secondary mesh to thereby search for a basic route to the destination. Subsequently, the CPU identifies a vehicle speed region for each road type from the average vehicle speed information and a vehicle speed region determination table, selects for each mesh ID of all the secondary meshes through which the basic route passes the statistical traffic information per vehicle speed region corresponding to the vehicle speed region identified for each road type from the statistical traffic information per vehicle speed region classified by road types, and distributes it to a navigation device.

5 Claims, 10 Drawing Sheets

(56) References Cited

U.S. PATENT DOCUMENTS

| | | |
|---|---|---|
| 2007/0076759 A1 | 4/2007 | Kim et al. |
| 2007/0155404 A1* | 7/2007 | Yamane et al. ............ 455/456.1 |
| 2007/0208493 A1 | 9/2007 | Downs et al. |
| 2008/0091647 A1 | 4/2008 | Gao Zhong et al. |
| 2011/0004397 A1* | 1/2011 | Nagase ........................ 701/119 |

FOREIGN PATENT DOCUMENTS

| | | |
|---|---|---|
| JP | B2 3960243 | 8/2007 |
| RU | 2006139791 | 5/2008 |
| WO | WO 2007/055439 A1 | 5/2007 |

OTHER PUBLICATIONS

Russian Patent Office, Decision on Grant of a Patent for Invention mailed Sep. 21, 2011 in Russian Patent Application No. 2010111885 w/English-language Translation.

Ozkarahan E., "Database machines and database management," Prentice Hall, 1986.

* cited by examiner

FIG. 4

| ROAD TYPE | AVERAGE VEHICLE SPEED DURING UNCONGESTED ROAD TRAVELING |
|---|---|
| NATIONAL EXPRESSWAY | 83.5 km/h |
| URBAN EXPRESSWAY | 70.3 km/h |
| NATIONAL HIGHWAY WITH TWO OR MORE LANES | 51.2 km/h |
| NATIONAL HIGHWAY WITH ONE LANE | 45.7 km/h |
| ⋮ | ⋮ |

| ROAD TYPE | USER'S AVERAGE VEHICLE SPEED | VEHICLE SPEED REGION |
|---|---|---|
| NATIONAL EXPRESSWAY | LESS THAN 80 km/h | RANK A |
| | LESS THAN 100 km/h | RANK B |
| | LESS THAN 120 km/h | RANK C |
| | 120 km/h AND OVER | RANK D |
| URBAN EXPRESSWAY | LESS THAN 60 km/h | RANK A |
| | LESS THAN 80 km/h | RANK B |
| | LESS THAN 100 km/h | RANK C |
| | 100 km/h AND OVER | RANK D |
| NATIONAL HIGHWAY WITH TWO OR MORE LANES | LESS THAN 30 km/h | RANK A |
| | LESS THAN 40 km/h | RANK B |
| | LESS THAN 50 km/h | RANK C |
| | 50 km/h AND OVER | RANK D |
| NATIONAL HIGHWAY WITH ONE LANE | LESS THAN 30 km/h | RANK A |
| | LESS THAN 40 km/h | RANK B |
| | LESS THAN 50 km/h | RANK C |
| | 50 km/h AND OVER | RANK D |
| ⋮ | ⋮ | ⋮ |

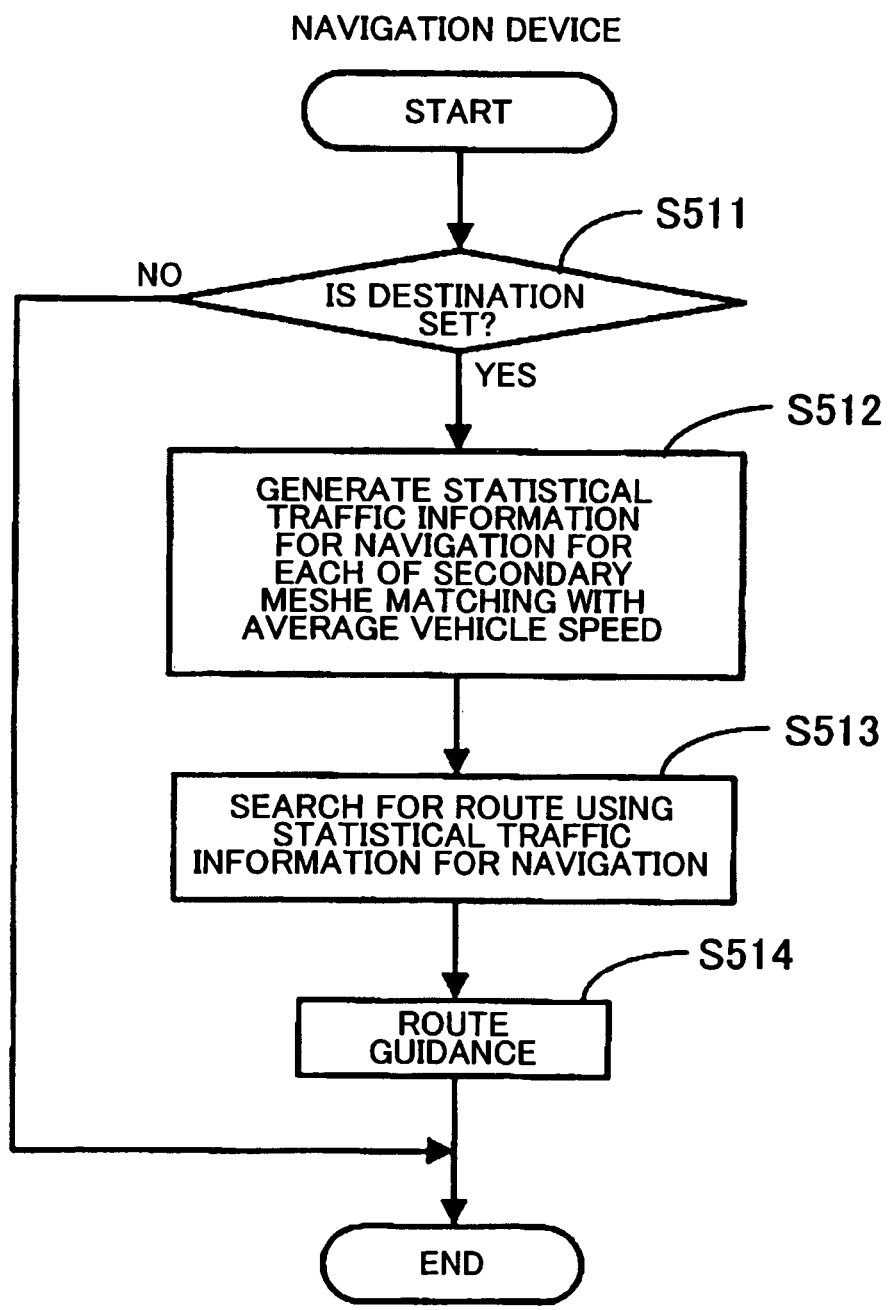

NAVIGATION SYSTEM AND ROUTE SEARCH METHOD

TECHNICAL FIELD

The present invention relates to a navigation system and a route search method for searching for a route to a destination.

BACKGROUND ART

Conventionally, there have been various proposals related to techniques for creating traffic information based on a traveling time of each link collected from a plurality of vehicles.

For example, there is a link travel time estimating device which collects a traveling time (travel time) of each vehicle for traveling a link based on detection information from a vehicle detector or road beacon disposed on the road, position information detected by a navigation device mounted in the vehicle, or the like and calculates the average value thereof so as to estimate a travel time for this link, (for example, refer to Japanese Patent Application Publication No. JP-A-2004-295165 (paragraphs [0015] to [0051], FIG. 1 to FIG. 8)).

DISCLOSURE OF THE INVENTION

Problems to be Solved by the Invention

In the structure described in above-described Japanese Patent Application Publication No. JP-A-2004-295165 (paragraphs [0015] to [0051], FIG. 1 to FIG. 8), however, since the calculated travel time for a link is an average value, each driver's driving characteristics are not considered. Accordingly, there is a problem that it is not possible to perform a route search considering the driver's driving characteristics when searching for a route to a destination.

Accordingly, the present invention was devised in order to solve the above-described problem, and it is an object of the present invention to provide a navigation system and a route search method which make it possible to perform a route search to a destination considering driver's driving characteristics.

Means for Solving the Problems

To achieve the above-described object, a navigation system according to a first aspect is characterized by including an average vehicle speed obtaining unit obtaining an average vehicle speed of a vehicle for each road type, a traffic information storage unit storing traffic information of each link which is classified by road type and classified by predetermined vehicle speed region, and a traffic information obtaining unit obtaining the traffic information corresponding to the average vehicle speed of the vehicle for each road type.

Further, a navigation system according to a second aspect is characterized by further including, in the navigation system according to the first aspect, a map information storage unit storing map information divided into a plurality of areas, an input unit inputting a place of departure and a destination, and a basic route search unit searching for a basic route from the place of departure to the destination based on the map information, in which the traffic information obtaining unit obtains the traffic information corresponding to a predetermined area including the basic route.

Further, a navigation system according to a third aspect is characterized in that, in the navigation system according to the first aspect or the second aspect, the average vehicle speed is an average vehicle speed during uncongested road traveling.

Furthermore, a route search method according to a fourth aspect is characterized by including an average vehicle speed obtaining step of obtaining an average vehicle speed of a vehicle for each road type, and a traffic information obtaining step of obtaining traffic information corresponding to the average vehicle speed of the vehicle for each road type from traffic information of each link which is classified by road type and classified by predetermined vehicle speed region.

Effects of the Invention

In the navigation system according to the first aspect having the above structure, it is possible to select traffic information corresponding to an average vehicle speed of a vehicle for each road type from traffic information of each link which is classified by road type and classified by predetermined vehicle speed region, and it is possible to obtain traffic information corresponding to an average vehicle speed on which driver's driving characteristics are reflected. Accordingly, it is possible to perform a route search based on traffic information considering the driver's driving characteristics.

Further, in the navigation system according to the second aspect, it is possible to obtain traffic information corresponding to a predetermined area including a basic route searched from a place of departure to a destination, and thus it is possible to select traffic information corresponding to an average vehicle speed of the vehicle for each road type only in a necessary area.

Further, in the navigation system according to the third aspect, it is possible to obtain traffic information corresponding to an average vehicle speed during uncongested road traveling of the vehicle for each road type, and it is possible to obtain traffic information on which the driver's driving characteristics are reflected further. Accordingly, it is possible to perform a route search further considering the driver's driving characteristics.

Furthermore, in the route search method according to the fourth aspect, it is possible to select traffic information corresponding to an average vehicle speed of a vehicle for each road type from traffic information of each link which is classified by road type and classified by predetermined vehicle speed region, and it is possible to obtain traffic information corresponding to an average vehicle speed on which driver's driving characteristics are reflected. Accordingly, it is possible to perform a route search based on traffic information considering the driver's driving characteristics.

BRIEF DESCRIPTION OF THE DRAWINGS

FIG. 4 is a figure showing an example of an average vehicle speed table stored in a traveling history DB;

FIG. 6 is a figure showing an example of a vehicle speed region determination table stored in a center side traffic information DB;

FIG. 10 is a flowchart showing an example of "route guidance processing" executed by the CPU of the navigation device in another embodiment.

BEST MODES FOR CARRYING OUT THE INVENTION

Hereinafter, a specific embodiment of a traveling information creating device, a traveling information creating method and a program according to the present invention that is implemented in a navigation system will be explained in detail with reference to the drawings.

Embodiment

Figure 1:
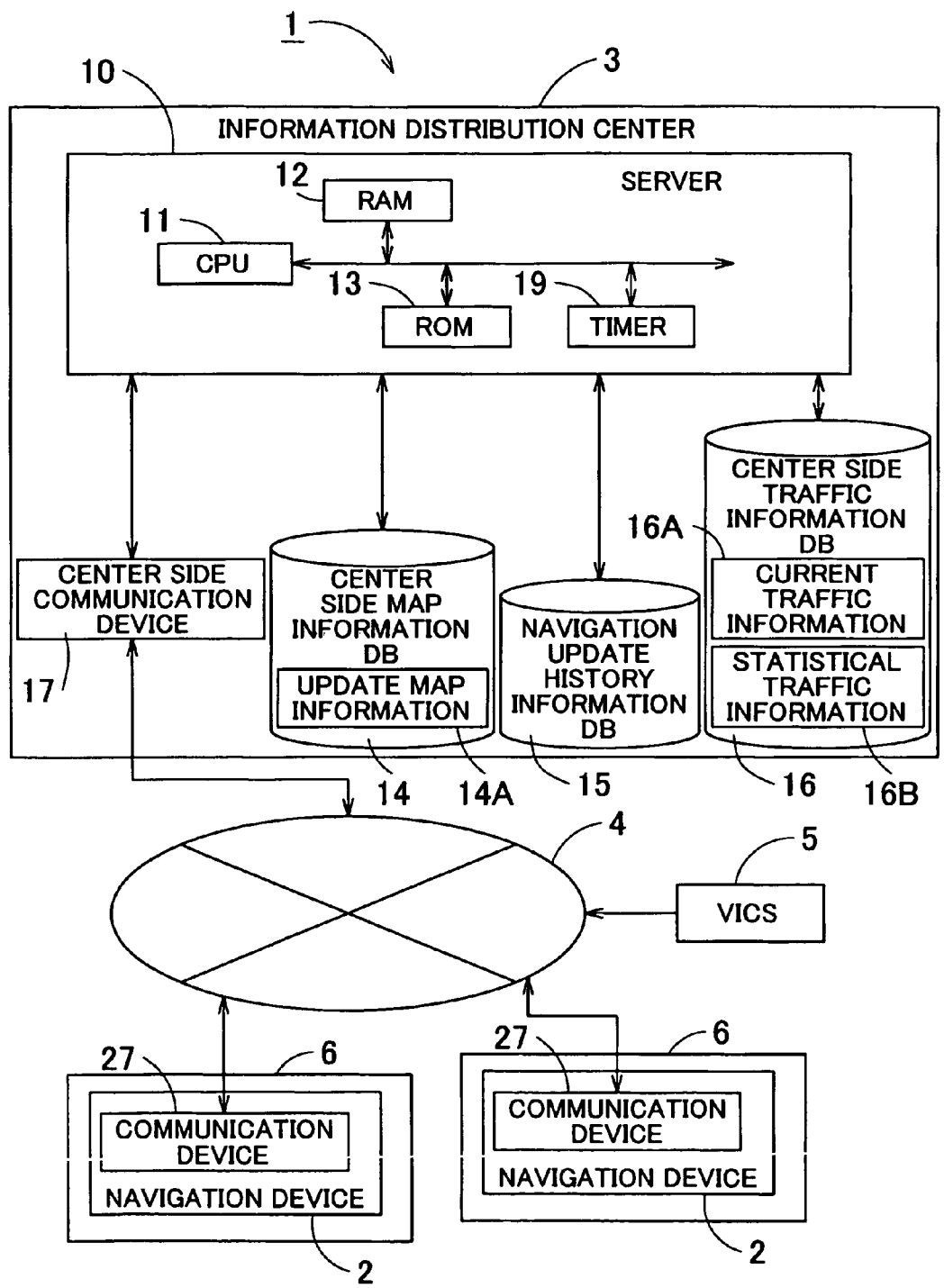
FIG. 1 is a block diagram showing a navigation system according to an embodiment.

First, a schematic structure of the navigation system 1 according to the present embodiment will be explained using FIG. 1. FIG. 1 is a block diagram showing a navigation system 1 according to the present embodiment.

As shown in FIG. 1, the navigation system 1 according to the present embodiment is structured basically from a navigation device 2 mounted in each probe car 6, an information distribution center 3 distributing traffic information (hereinafter referred to as "statistical traffic information") created by statistically processing a travel time (link cost) or the like for each link based on update information for updating map information for the navigation device 2 and probe information collected from each navigation device 2, which will be described later, and a network 4. Then the navigation device 2 and the information distribution center 3 are structured to be capable of transmitting/receiving various information via the network 4.

Note that the structure of the navigation device 2 will be explained in detail later using FIG. 2.

Further, as the network 4, a communication system such as a LAN (Local Area Network), a WAN (Wide Area Network), an intranet, a mobile telephone network, a telephone line network, a public communication line network, a dedicated communication line network, or a communication line network such as the Internet can be used for example. Further, a vehicle information and communication system center (VICS (registered trademark)) 5 is connected to the network 4. The navigation device 2 and the information distribution center 3 are structured to be capable of receiving, at every predetermined time via the network 4, information regarding a traffic jam or the like on a road, traffic information of traffic restriction information, and the like, which are created by collecting information from a traffic control system of the police, the Japan Highway Public Corporation, or the like.

As shown in FIG. 1, the information distribution center 3 has a server 10, a center side map information database (center side map information DB) 14 as a map information recording unit connected to the server 10, a navigation update history information database (navigation update history information DB) 15, a center side traffic information database (center side traffic information DB) 16, and a center side communication device 17.

Further, the server 10 has a CPU 11 as a processing device and a control device performing overall control of the server 10, and internal storage devices such as a RAM 12 which is used as a working memory when the CPU 11 performs various calculation processing, and a ROM 13 storing various control programs, which are used for performing map information update processing of extracting from the center side map information DB 14 update information for updating map information of a predetermined area in map information stored in the navigation device 2 to a new version of map information based on a request from the navigation device 2 and distributing the update information to the navigation device 2, current traffic information distribution processing of distributing current traffic information via the network 4, and the like. The server 10 also has a timer 19 for measuring time.

Further, the ROM 13 stores control programs, which are for performing statistical traffic information creation processing (refer to FIG. 7) of creating statistical traffic information by statistically processing a link cost of each link for each of road types and for each of vehicle speed regions of rank A to rank D based on, as will be described later, probe information (for example, month, day and time, link information (mesh ID, link ID, link length, presence of traffic signal, road type, and the like), traffic status (travel time, degree of traffic jam, speed, and the like), vehicle position, secondary mesh ID to which the vehicle position belongs, operation status of wipers, temperatures of outside vehicle/road surface, weather, antilock brake system (ABS) operation information, road surface condition, vehicle information (vehicle type, performance specification, vehicle speed, occupant, weight distribution ratio of the vehicle, way of application of torque, and the like), average vehicle speed information for respective road types, and the like) collected from the navigation device 2 mounted in the probe car 6, statistical traffic information distribution processing (refer to FIG. 8) distributing statistical traffic information via the network 4 based on a request from the navigation device 2, or the like.

Here, as the road types, there are national expressways, urban expressways, motor highways, ordinary toll roads, national highways with two or more lanes, national highways with one lane, prefectural highways with two or more lanes, prefectural highways with one lane, municipal roads, and the like.

Further, in the center side map information DB 14, update map information 14A, which is created in the information distribution center 3 and is basic map information when updating map information stored in the navigation device 2, is divided into each version and stored. Furthermore, there is also stored update information for updating a part or all of the current map information stored in the navigation device 2 to the update map information 14A. Here, the version is creation period information for identifying the period in which the map information is created, and by referring to the version it is possible to identify the period in which the map information was created.

Further, in the update map information 14A stored in the center side map information DB 14, there is recorded various information needed for performing route guidance and map display by the navigation device 2. For example, the update map information 14A includes map display data for displaying a map, intersection data regarding intersections, node data regarding node points, link data regarding a road which is one type of facilities (road link), search data for searching for a route, shop data regarding a point of interest (POI) such as a shop or the like which is one type of facilities, search data for searching for a point, and the like.

Here, the map display data are constituted of units divided into four (½ length), into 16 (¼), and into 64 (⅛) based on secondary meshes sectioned by approximately 10 km×10 km, and units of respective points are set so that data amounts of the units are at substantially same levels. A unit of the smallest 64-division size has a dimension of about 1.25 km square.

Further, the map display data are sectioned into three distribution road sections: high-standard road section including national expressways, urban expressways, motor highways, ordinary toll roads, and national roads with one- or two-digit number; open road section including national highways with three-digit number or larger, major regional roads, prefectural roads, municipal roads, and the like; and narrow street section including narrow streets. They are stored in the update map information 14A and controlled for each version. Furthermore, there are recorded data regarding access roads (ramp ways) at an entrance and an exit of a toll road, toll gate (interchange), and the like for toll roads.

At timing when there is a request from the navigation device 2, the information distribution center 3 updates the map information stored in the navigation device 2 by the latest version of update map information 14A among the update map information 14A stored in the center side map information DB 14.

Further, the navigation update history information DB 15 stores information regarding update histories of updating the map information stored in the navigation device 2 up to now, together with a navigation identification ID for identifying the navigation device 2. As the update histories, regarding link data and node data specifically constituting the map information, which version of map information is used is stored for each of the three distribution road sections, the high-standard road section, the open road section and the narrow street section. Every time the map information in the navigation device 2 is updated, it is rewritten to the new update history.

Further, in the center side traffic information DB 16, there is stored current traffic information 16A as information regarding a current traffic jam on a road or the like, which is created by collecting probe information (for example, month, day and time, link information (mesh ID, link ID, link length, presence of traffic signal, road type, and the like), traffic status (travel time, degree of traffic jam, speed, and the like), vehicle position, secondary mesh ID to which the vehicle position belongs, operation status of wipers, temperatures of outside vehicle/road surface, weather, antilock brake system (ABS) operation information, road surface condition, vehicle information (vehicle type, performance specification, vehicle speed, occupant, weight distribution ratio of the vehicle, way of application of torque, and the like), average vehicle speed information for respective road types, and the like) collected by the navigation device 2 mounted in the probe car 6, and traffic information received from the vehicle information and communication system center 5.

Further, in the center side traffic information DB 16, there is stored statistical traffic information 16B (refer to FIG. 7) created by statistically processing a link cost of each link for each of road types and for each of vehicle speed regions of rank A to rank D based on probe information (for example, month, day and time, link information (mesh ID, link ID, link length, presence of traffic signal, road type, and the like), traffic status (travel time, degree of traffic jam, speed, and the like), vehicle position, secondary mesh ID to which the vehicle position belongs, operation status of wipers, temperatures of outside vehicle/road surface, weather, antilock brake system (ABS) operation information, road surface condition, vehicle information (vehicle type, performance specification, vehicle speed, occupant, weight distribution ratio of the vehicle, way of application of torque, and the like), average vehicle speed information for respective road types, and the like) collected from each probe car 6 as will be described later.

At timing when there is a request from the navigation device 2 as will be described later, the information distribution center 3 selects and distributes the statistical traffic information 16B or the like stored in the center side traffic information DB 16 (refer to FIG. 8).

Next, a schematic structure of the navigation device 2 constituting the navigation system 1 according to the present embodiment will be explained using FIG. 2. FIG. 2 is a block diagram showing the navigation device 2 according to the present embodiment.

Figure 2:
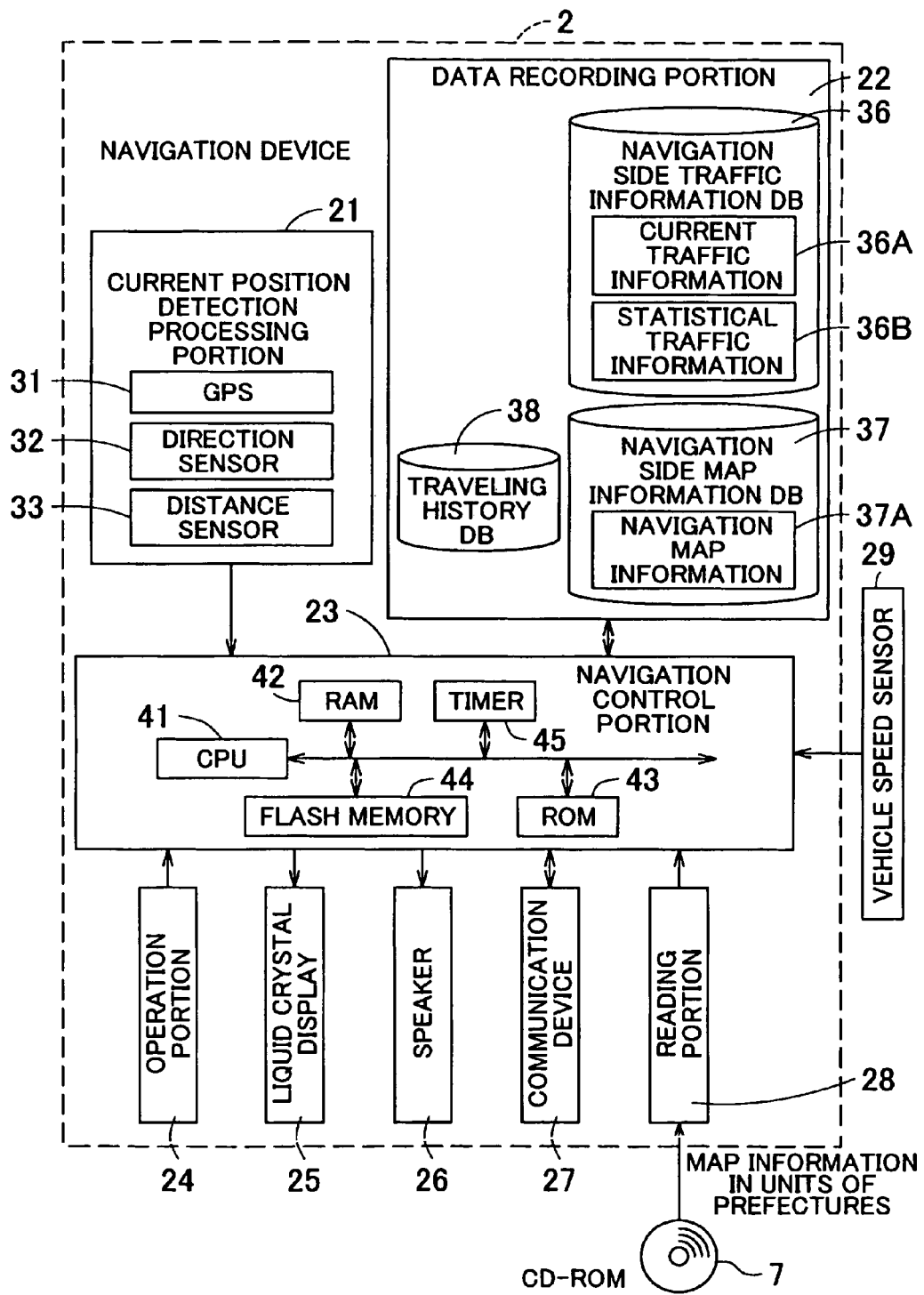
FIG. 2 is a block diagram showing a navigation device of the navigation system.

As shown in FIG. 2, the navigation device 2 according to the present embodiment has a current position detection processing portion 21 detecting the current position of a vehicle, a data recording portion 22 in which various data are recorded, a navigation control portion 23 performing various calculation processing based on inputted information, an operation portion 24, a liquid crystal display 25, a speaker 26, a communication device 27, and a reading portion 28. Further, a vehicle speed sensor 29 detecting the traveling speed of a vehicle is connected to the navigation control portion 23.

The components constituting the navigation device 2 will be explained below. The current position detection processing portion 21 has a GPS 31, a direction sensor 32, a distance sensor 33, an altimeter (not shown), and so on, and is capable of detecting the current position, direction, traveling distance, or the like of the vehicle.

Further, the data recording portion 22 has a hard disk (now shown) as an external storage device and a storage medium, and a recording head (not shown) which is a driver for reading a navigation side traffic information database (navigation side traffic information DB) 36, a navigation side map information database (navigation side map information DB) 37, a traveling history database (traveling history DB) 38, a predetermined program, or the like stored in the hard disk, and for writing predetermined data in the hard disk.

Here, the navigation side traffic information DB 36 stores current traffic information 36A created from road traffic jam information regarding a current traffic jam on a road or the like which includes the actual length of a traffic jam, the degree of a traffic jam (traffic jam/congestion/uncongested road, or the like), required time, cause of a traffic jam, an expected time when the traffic jam is alleviated, and/or traffic restriction information due to road construction, building operation, or the like, which are received from the information distribution center 3 and the vehicle information and communication system center 5.

Further, in statistical traffic information 36B of the navigation side traffic information DB 36, statistical traffic information distributed via the communication device 27 from the information distribution center 3 as will be described later is stored (refer to FIG. 9). Then the contents of the statistical traffic information stored in the statistical traffic information 36B are updated by downloading update information distributed from the information distribution center 3 via the communication device 27.

Further, the navigation side map information DB 37 stores navigation map information 37A used for traveling guidance or a route search by the navigation device 2 and is subject to update by the information distribution center 3. Here, the navigation map information 37A includes various information needed for route guidance and map display similarly to the update map information 14A, and includes, for example, newly built road information for identifying each newly built road, map display data for displaying a map, intersection data regarding intersections, node data regarding node points, link data regarding a road (link), search data for searching for a route, shop data regarding POI such as a shop or the like which is one type of facilities, search data for searching for a point, and the like. Then the contents of the navigation side map information DB 37 are updated by downloading update information distributed from the information distribution center 3 via the communication device 27. Note that the navigation device 2 may be structured so as to update the contents of the navigation side map information DB 37 by storing update map information supplied via the CD-ROM 7 or the like.

Further, for every travel through a link, the traveling history DB 38 sequentially stores link traveling information (for example, month, day, time, link information (mesh ID, link ID, link length, presence of traffic signal, road type, and the like), traffic status (travel time, degree of traffic jam, speed, and the like), vehicle position, secondary mesh ID to which the vehicle position belongs, operation status of wipers, temperatures of outside vehicle/road surface, weather, antilock brake system (ABS) operation information, road surface condition, vehicle information (vehicle type, performance specification, vehicle speed, occupant, weight distribution ratio of the vehicle, way of application of torque, and the like)).

Further, in the traveling history DB 38, as will be described later, there is stored an average vehicle speed table 48 (refer to FIG. 4) in which average vehicle speeds during uncongested road traveling for respective road types are stored.

Figure 5:
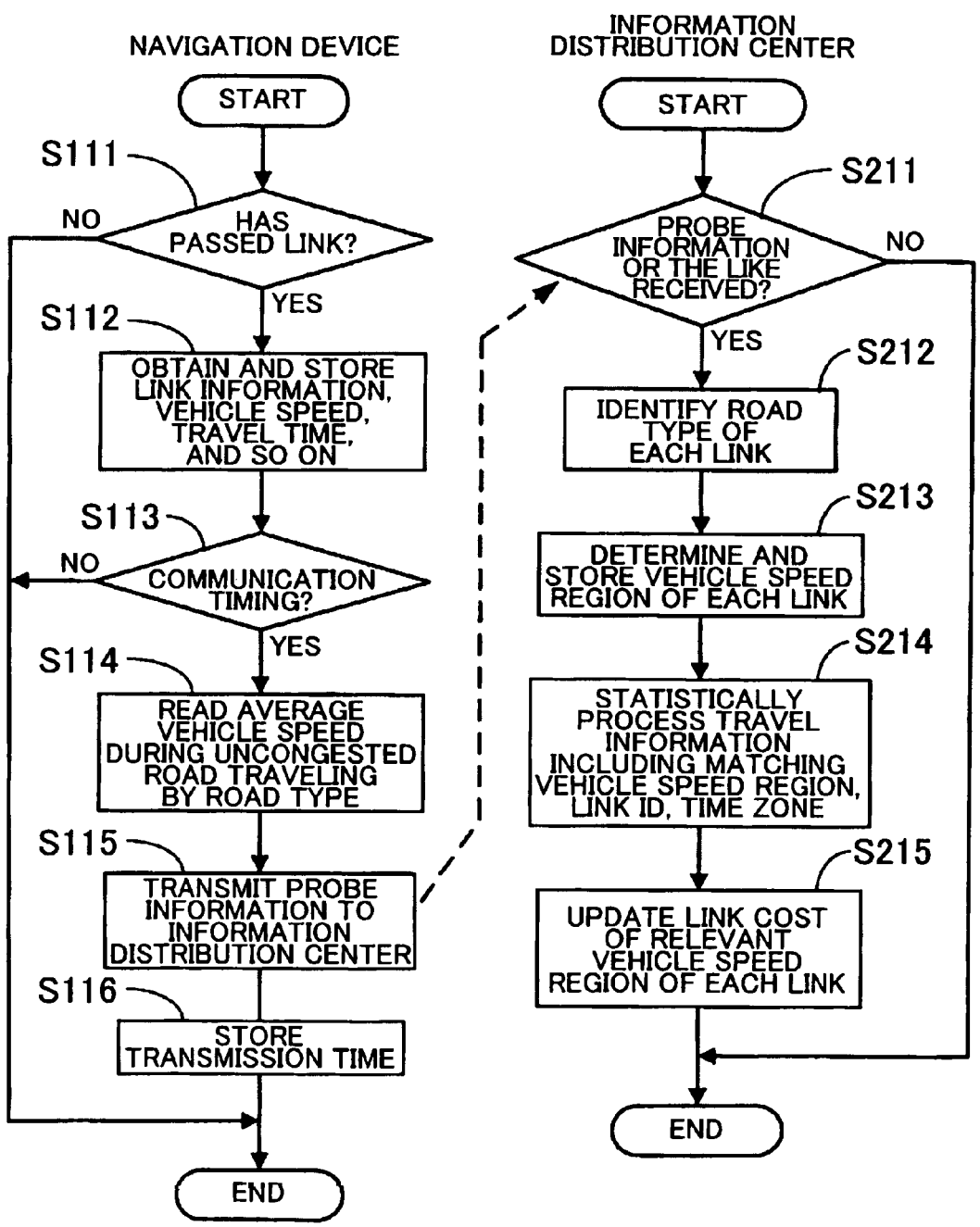
FIG. 5 is a flowchart showing "probe information transmission processing" executed by the navigation device mounted in a probe car of the navigation system and "statistical traffic information creation processing" executed by an information distribution center.

When a probe car 6 is traveling, the navigation device 2 mounted in the probe car 6 transmits link traveling information and data of average vehicle speeds during uncongested road traveling for respective road types, which are newly stored in the traveling history DB 38 from the previous transmission time of transmitting probe information, as probe information to the information distribution center 3 via the communication device 27 at every predetermined time (for example, "every minute", "every five minutes", "every fifteen minutes", "every thirty minutes", or the like) or at every time when traveling a link, as will be described later (refer to FIG. 5).

Further, as shown in FIG. 2, the navigation control portion 23 constituting the navigation device 2 has a CPU 41 as a processing device and a control device performing overall control of the navigation device 2, and internal storage devices such as a RAM 42 which is used as a working memory when the CPU 41 performs various calculation processing and in which route data when searching for a route, statistical traffic information received from the information distribution center 3, or the like is stored, a ROM 43 in which a probe information transmission processing program for obtaining probe information and transmitting probe information or the like to the information distribution center 3 at every predetermined time, and the like are stored besides a control program, and a flash memory 44 storing a program read from the ROM 43. The navigation control portion 23 also has a timer 45 for measuring time, and so on.

Further, in the present embodiment, various programs are stored in the ROM 43, and various data are stored in the data recording portion 22. However, the program, data, or the like can be read from a same external storage device, memory card, or the like and can be written in the flash memory 44. Furthermore, the program, data or the like can be updated by replacing a memory card or the like.

Furthermore, various peripheral devices (actuators) of the operation portion 24, the liquid crystal display 25, the speaker 26, the communication device 27, and the reading portion 28 are electrically connected to the navigation control portion 23.

The operation portion 24 is operated when modifying the current position at the time of starting traveling and inputting a place of departure as a guidance start point and a destination as a guidance end point, when searching for information regarding a facility, or the like and is structured from a plurality of operation switches such as various keys. Then, the navigation control portion 23 performs control for executing various corresponding operations based on switch signals outputted by pressing down of respective switches, or the like. In addition, the operation portion 24 can also be structured from a keyboard, a mouse, or the like, or a touch panel provided on a front face of the liquid crystal display 25.

Further, the liquid crystal display 25 displays operation guidance, an operation menu, guidance for keys, a guiding route from the current position to a destination, guidance information along a guiding route, traffic information, news, weather forecast, time, an e-mail, a television program, or the like.

Further, the speaker 26 outputs traveling guidance along a guiding route, audio guidance for warning to stop or to confirm the safety at an intersection or crosswalk, or the like based on an instruction from the navigation control portion 23. Here, audio guidance to be given is "200 meters ahead, in the right hand direction at XY intersection", or the like for example.

Further, the communication device 27 is a communication unit by means of a mobile phone network or the like performing communication with the information distribution center 3, and performs transmission/reception of the latest version of update map information, statistical traffic information, or the like to/from the information distribution center 3. Further, the communication device 27 receives traffic information including respective information such as traffic jam information or a congestion status at a service area transmitted from the vehicle information and communication system center 5 or the like, in addition to the information distribution center 3.

The reading portion 28 is structured to be capable of reading a predetermined version of map information, statistical traffic information, or the like recorded in units of prefectures from the CD-ROM 7 as a recording medium. In addition, the reading portion 28 may also be structured to be capable of reading not only the CD-ROM 7 but map information or the like recorded in a DVD.

Next, average vehicle speed table creation and update processing will be explained based on FIG. 3 and FIG. 4, in which the CPU 41 of the navigation device 2 in the navigation system 1 having the above structure creates and updates an average vehicle speed table from vehicle speeds during uncongested road traveling in the past for respective road types.

Figure 3:
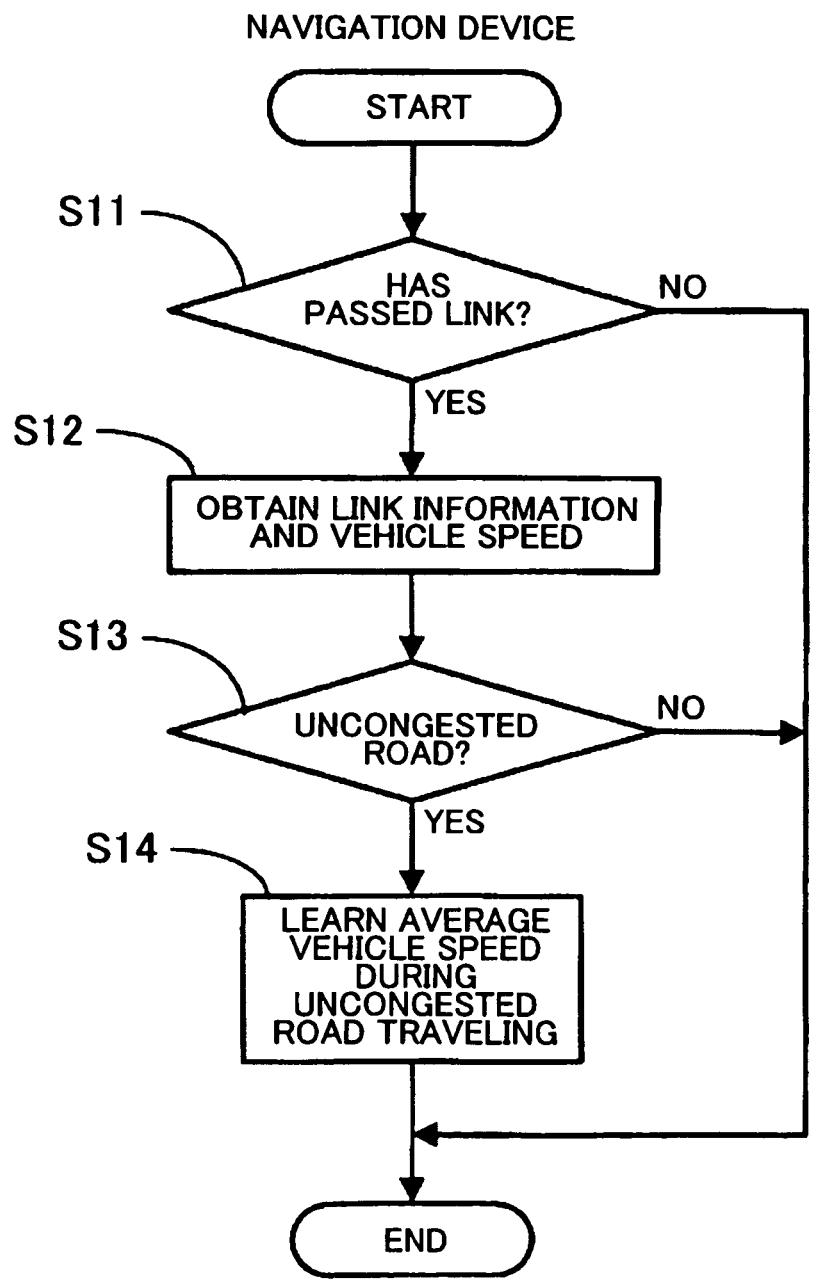
FIG. 3 is a flowchart showing average vehicle speed table creation and update processing executed by a CPU of the navigation device for creating and updating an average vehicle speed table.

FIG. 3 is a flowchart showing the average vehicle speed table creation and update processing executed by the CPU 41 of the navigation device 2 for creating and updating an average vehicle speed table from vehicle speeds during uncongested road traveling in the past for respective road types. FIG. 4 is a figure showing an example of the average vehicle speed table 48 stored in the traveling history DB 38. Note that the program shown by the flowchart of FIG. 3 is stored in the ROM 43 of the navigation device 2, and is executed at every predetermined time (for example, at every 0.1 second) by the CPU 41.

As shown in FIG. 3, first in step (hereinafter abbreviated to S) 11, the CPU 41 detects the current position of the vehicle (hereinafter referred to as "vehicle position") and a vehicle direction representing the direction of the vehicle by the current position detection processing portion 21, and stores coordinate data (for example, data of latitude and longitude) representing the vehicle position and the vehicle direction in the RAM 42. Further, the CPU 41 executes determination processing of determining, from the navigation map information 37A, whether or not the vehicle position has passed a node point that is the end point of the link on which the vehicle is currently traveling, that is, whether or not it has passed the link on which the vehicle is currently traveling.

Then, when the vehicle position has not passed the node point that is the end point of the link on which the vehicle is currently traveling, that is, when it has not passed the link on which the vehicle is currently traveling (S11: NO), the CPU 41 ends the processing.

On the other hand, when the vehicle position has passed the node point that is the end point of the link on which the vehicle is currently traveling, that is, when it has passed the link on which the vehicle is currently traveling (S11: YES), the CPU 41 proceeds to processing of S12.

In S12, the CPU 41 obtains link information (mesh ID, link ID, link length, presence of traffic signal, road type, and the like) related to the passed link from the navigation map information 37A and stores it in the RAM 42. Further, the CPU 41 obtains a travel time for the passed link and stores it in the RAM 42, divides the link length of the link by the travel time to calculate the vehicle speed, and stores it in the RAM 42.

Subsequently, in S13, the CPU 41 executes determination processing of determining whether or not the degree of traffic jam of the passed link is an uncongested road from the road traffic jam information stored in the current traffic information 36A.

Then, when it is determined that the passed link is an uncongested road (S13: NO), the CPU 41 ends the processing.

Note that the CPU 41 may determine that the link is an uncongested road when the vehicle speed in the passed link is approximately 30 km per hour and over in an open road such as a national highway, a prefectural road, or the like, approximately 50 km per hour and over in an urban expressway, or approximately 70 km per hour and over in a national expressway.

On the other hand, when it is determined that the passed link is an uncongested road (S13: YES), the CPU 41 proceeds to processing of S14. In S14, the CPU 41 reads the road type and the vehicle speed of the link from the RAM 42, and stores together with the current date and time information (for example, year, month, day, day of the week, time, and the like) in the traveling history DB 38. Further, the CPU 41 reads vehicle speed data of a predetermined period (for example, for the past six months) corresponding to the stored road type from the traveling history DB 38, and calculates an average value of these vehicle speed data. Then, the CPU 41 stores and updates the calculated average value as the "average vehicle speed during uncongested road traveling" corresponding to the road type of the passed link in the average vehicle speed table 48 (refer to FIG. 4) stored in the traveling history DB 38, and thereafter ends the processing.

Here, an example of the average vehicle speed table 48 stored in the traveling history DB 38 will be explained based on FIG. 4.

As shown in FIG. 4, the average vehicle speed table 48 is constituted of "road types" and "average vehicle speed during uncongested road traveling" representing average vehicle speed during uncongested road traveling for the "road type". Therefore, the average vehicle speed table 48 represents the driver's driving characteristics during uncongested road traveling for respective road types.

For example, when the "average vehicle speed during uncongested road traveling" corresponding to a "national expressway" is "83.5 km/h", it represents that the driver travels an uncongested road on a national expressway at approximately 83.5 km/h.

Next, explanation will be given based on FIG. 5 to FIG. 7 about "probe information transmission processing" in which the CPU 41 of the navigation device 2 transmits link traveling information including link information or the like and data of the "average vehicle speeds during uncongested road traveling" of the average vehicle speed table 48 as probe information to the information distribution center 3 at predetermined intervals (for example, approximately every five minutes), in the navigation system 1, and "statistical traffic information creation processing" which the CPU 11 of the information distribution center 3 executes when receiving probe information from the navigation device 2.

FIG. 5 is a flowchart showing the "probe information transmission processing" executed by the navigation device 2 mounted in a probe car 6 in the navigation system 1 and the "statistical traffic information creation processing" executed by the information distribution center 3.

First, based on FIG. 5, the "probe information transmission processing" executed by the CPU 41 of the navigation device 2 mounted in the probe car 6 will be explained. In addition, in FIG. 5, the program shown by the flowchart of S111 to S116 is stored in the ROM 43 provided in the navigation device 2, and is executed at every predetermined time by the CPU 41 (for example, every 0.1 second).

As shown in FIG. 5, first in S111, the CPU 41 detects the vehicle position and the vehicle direction by the current position detection processing portion 21, and stores coordinate data (for example, data of latitude and longitude) representing the vehicle position and the vehicle direction in the RAM 42. Further, the CPU 41 executes determination processing of determining, from the navigation map information 37A, whether or not the vehicle position has passed a node point that is the end point of the link on which the vehicle is currently traveling, that is, whether or not it has passed the link on which the vehicle is currently traveling.

Then, when the vehicle position has not passed the node point that is the end point of the link on which the vehicle is currently traveling, that is, when it has not passed the link on which the vehicle is currently traveling (S111: NO), the CPU 41 ends the processing.

On the other hand, when the vehicle position has passed the node point that is the end point of the link on which the vehicle is currently traveling, that is, when it has passed the link on which the vehicle is currently traveling (S111: YES), the CPU 41 proceeds to processing of S112.

In S112, the CPU 41 obtains link information (mesh ID, link ID, link length, presence of traffic signal, road type, and the like) related to the passed link from the navigation map information 37A and stores it in the RAM 42. Further, the CPU 41 obtains a travel time for the passed link and stores it in the RAM 42, divides the link length of the link by the travel time to calculate the vehicle speed, and stores it in the RAM 42. Then the CPU 41 stores information associated with the link information, travel time, vehicle speed, vehicle position, month, day and time data, and so on as link traveling information and stores it in the RAM 42.

Subsequently, in S113, the CPU 41 reads from the RAM 42 transmission time data representing the previous transmission time of transmitting probe information or the like to the information distribution center 3, and executes determination processing of determining whether or not a predetermined certain time (for example, about five minutes) is passed from the previous time. That is, the CPU 41 executes determination processing of determining whether or not it is a communication timing to transmit probe information or the like to the information distribution center 3.

Then, when the predetermined certain time has not passed from the previous transmission time of transmitting probe information to the information distribution center 3 (S113: NO), the CPU 41 ends the processing.

On the other hand, when the predetermined certain time has passed from the previous transmission time of transmitting probe information to the information distribution center 3 (S113:YES), the CPU 41 proceeds to processing of S114. In S114, the CPU 41 reads the "average vehicle speed during uncongested road traveling" for respective road types from the average vehicle speed table 48 (refer to FIG. 4) stored in the traveling history DB 38, and stores them in the RAM 42 as average vehicle speed information to be transmitted to the information distribution center 3.

Subsequently, in S115, the CPU 41 reads from RAM 42 the link traveling information (link information (mesh ID, link ID, link length, presence of traffic signal, road type, and the like), travel time, vehicle speed, vehicle position, month, day and time data, and the like) and the average vehicle speed information, and transmits them as probe information to the information distribution center 3 together with a navigation identification ID identifying the navigation device 2.

Then in S116, the CPU 41 reads current time data from the timer 45, stores it as transmission time data indicating the time of transmitting the probe information to the information distribution center 3 in the RAM 42, and ends the processing.

Next, based on FIG. 5, the "statistical traffic information creation processing" executed by the CPU 11 of the information distribution center 3 will be explained. In addition, the program shown by the flowchart of S211 to S215 in FIG. 5 is stored in the ROM 13 provided in the information distribution center 3, and is executed at every predetermined time (for example, about every 0.01 second to 0.1 second) by the CPU 11.

First, in S211, the CPU 11 executes determination processing of determining whether or not there is received probe information which is transmitted from the navigation device 2 in above S115 and includes link travel information (link information (mesh ID, link ID, link length, presence of traffic signal, road type, and the like), travel time, vehicle speed, vehicle position, month, day and time data, and the like), average vehicle speed information, and the like.

Then when the probe information is not received (S211: NO), the CPU 11 ends the processing.

On the other hand, when the probe information including link traveling information (link information (mesh ID, link ID, link length, presence of traffic signal, road type, and the like), travel time, vehicle speed, vehicle position, month, day and time data, and the like), average vehicle speed information, and the like is received (S211: YES), the CPU 11 stores the received probe information in the RAM 12, and thereafter proceeds to processing of S212. In S212, the CPU 11 reads the link ID and the road type of each link included in the received probe information, associates the link ID with the road type and stores it in RAM 12.

Then, in S213, from the road type corresponding to each link ID and the average vehicle speed information, the CPU 11 reads the user's average vehicle speed during uncongested road traveling for the road type corresponding to the link ID, associates the road type corresponding to the link ID with the user's average vehicle speed during uncongested road traveling, and stores them in the RAM 12. Then the CPU 11 determines the vehicle speed region that corresponds to the road type corresponding to the link ID and the user's average vehicle speed during uncongested road traveling from a vehicle speed region determination table 50 stored in the center side traffic information DB 16. Thereafter, the CPU 11 reads the mesh ID, link ID, road type, travel time, and day and time data from the probe information, associates them with the determined vehicle speed region, creates traffic information (mesh ID, link ID, road type, vehicle speed region, day and time data, and travel time) for each road type, and stores it in the center side traffic information DB 16.

Here, an example of the vehicle speed region determination table 50 stored in the center side traffic information DB 16 will be explained based on FIG. 6. FIG. 6 is a figure showing an example of the vehicle speed region determination table 50 stored in the center side traffic information DB 16.

As shown in FIG. 6, the vehicle speed region determination table 50 is constituted of "road type" representing road types of respective links, "user's average vehicle speed" representing a plurality of ranges of user's average vehicle speeds during uncongested road traveling corresponding to the road type (for example, four types of ranges of average vehicle speeds), and "vehicle speed region" representing classification of the "user's average vehicle speed" (for example, four stages of rank A to rank D).

For example, when the "road type" is "national expressway", as the "user's average vehicle speed", four types of ranges of average vehicle speeds, "less than 80 km/h", "less than 100 km/h", "less than 120 km/h", and "120 km/h and over" are stored. Further, as the "vehicle speed region" representing the "user's average vehicle speed", "rank A" for "less than 80 km/h", "rank B" for "less than 100 km/h", "rank C" for "less than 120 km/h", and "rank D" for "120 km/h and over" are stored.

Therefore, in S213, the CPU 11 takes the road type corresponding to the link ID as the "road type" of the vehicle speed region determination table 50, and identifies the range that includes the user's average vehicle speed during uncongested road traveling for the road type corresponding to the link ID from the four types of ranges of average vehicle speed of the "user's average vehicle speed" corresponding to the "road type". Thereafter, the CPU 11 can determine the "vehicle speed region" representing the identified classification of "user's average vehicle speed".

For example, when the road type corresponding to the link ID is "national expressway" and the average vehicle speed of the user for "national expressway" is "83.5 km" (refer to FIG. 4), the CPU 11 identifies "national expressway" for the "road type" and "less than 100 km/h" for the "user's average vehicle speed" in the vehicle speed region determination table 50, and determines the "rank B" as the "vehicle speed region" representing the identified classification "less than 100 km/h".

Thereafter, the CPU 11 reads the mesh ID, link ID, road type, travel time, and day and time data from the probe information, associates them with "rank B", which is the vehicle speed region corresponding to the link ID, to create traffic information (mesh ID, national expressway, link ID, vehicle speed region "rank B", day and time data, travel time) for the road type "national expressway", and stores it in the center side traffic information DB 16.

Subsequently, in S214 as shown in FIG. 5, the CPU 11 reads traffic information in a certain period (for example, for the past six months) including matching link IDs, road types, vehicle speed regions and time zones to which day and time data belong (for example, a time zone of 9:00 to 9:14) from the traffic information stored in the center side traffic information DB 16 in above S213, statistically processes respective travel times to calculate a link cost 51C (refer to FIG. 7) corresponding to the link ID, road type and vehicle speed region, and stores it in the RAM 12.

Then in S215, the CPU 11 reads the link cost 51C from the RAM 12. Taking the link ID, road type, vehicle speed region and time zone to which day and time data belong of the traffic information stored in the center side traffic information DB 16 in above S213 as the link ID 51A, vehicle speed region 51D, and time zone 51B of the relevant road type of the statistical traffic information 16B, which are substituted into the link cost 51C corresponding to them in the statistical traffic information 16B to update it, and then ends the processing.

Therefore, for each road type, updates are performed to the link cost 51C of the vehicle speed region 51D (refer to FIG. 7) of the statistical traffic information 16B corresponding to the "average vehicle speed during uncongested road traveling" for each road type in which driving characteristics of the driver, who is the user of the navigation device 2 which transmitted probe information, appear most significantly.

Here, an example of a data structure of the statistical traffic information 16B stored in the center side traffic information DB 16 will be explained based on FIG. 7. FIG. 7 is an explanatory diagram showing the example of the data structure of the statistical traffic information 16B stored in the center side traffic information DB 16.

Figure 7:
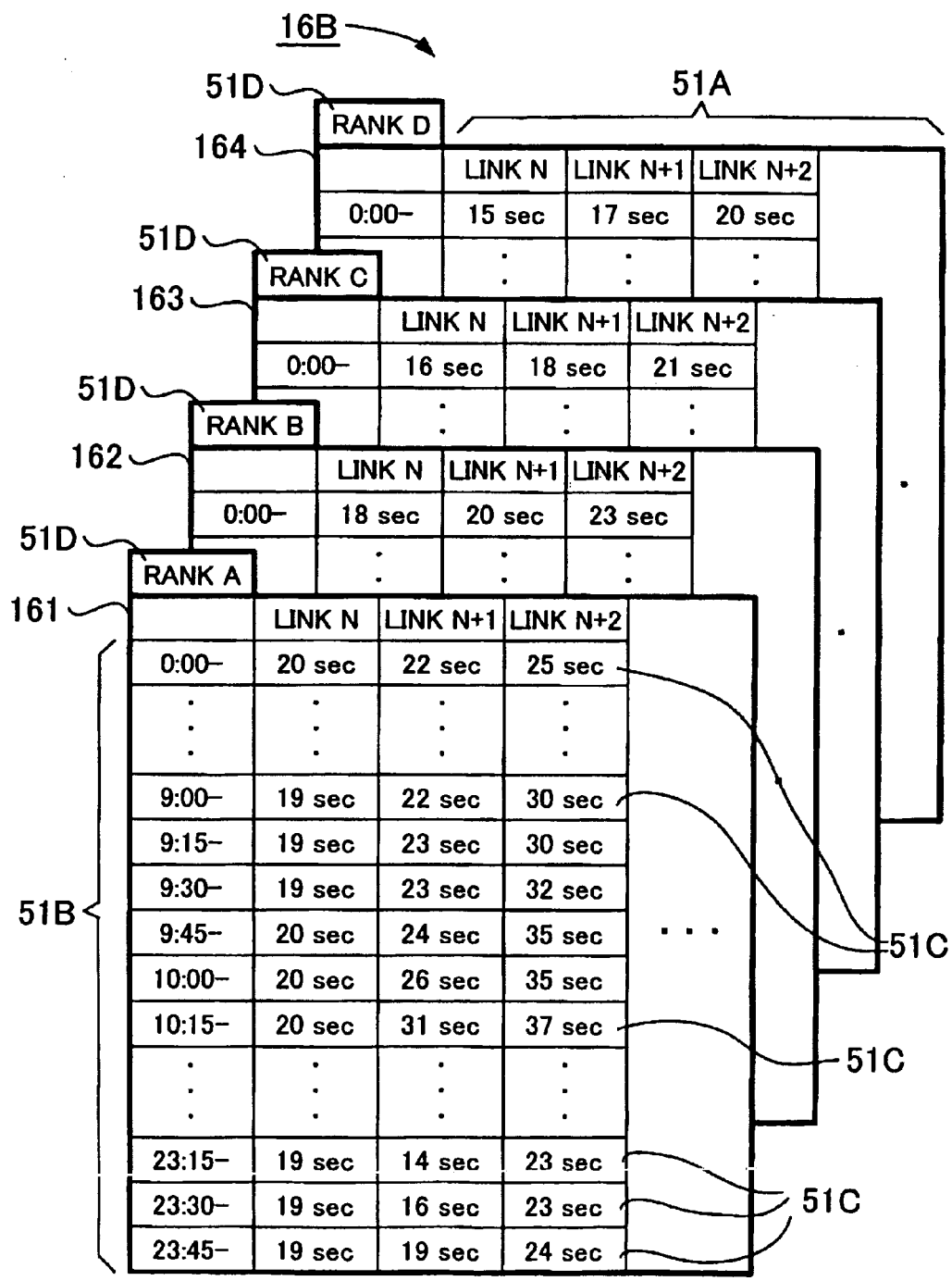
FIG. 7 is an explanatory diagram showing an example of a data structure of statistical traffic information stored in the center side traffic information DB.

As shown in FIG. 7, the statistical traffic information 16B is generated, for example, for each mesh ID added to each secondary mesh as an area and classified by road type such as "national expressway", and includes statistical traffic information per vehicle speed region 161 to 164 which are classified by vehicle speed regions 51D of rank A to rank D. Note that the rank A to rank D of each vehicle speed region 51D corresponds to the rank A to rank D (refer to FIG. 6) of the "vehicle speed region" in the vehicle speed region determination table 50.

Further, the statistical traffic information per vehicle speed region 161 to 164 each have link costs 51C for the link ID 51A of each link for every time zone 51B. The time zones 51B are the time zones that are set for every 15 minutes (for example "0:00" to "0:14", or the like). Further, the link costs 51C are the data each indicating an average required travel time when passing the link thereof during a certain time zone 51B, and is shown as "20 (seconds)" or the like for example.

Further, the link costs 51C of the statistical traffic information per vehicle speed region 161 to 164 are each generated by reading traffic information in a certain period (for example, for the past six months) including matching vehicle speed regions 51D, link IDs 51A and road types of the statistical traffic information per vehicle speed region 161 to 164 from the traffic information (mesh ID, link ID, road type, vehicle speed region, day and time data, and travel time) stored in the center side traffic information DB 16 in above S213, and statistically processing for each of the time zones 51B a travel time of day and time data belonging to the time zone 51B, in above S214 and S215.

Therefore, by executing above S211 to S215, every time the probe information including link traveling information (link information (mesh ID, link ID, link length, presence of traffic signal, road type, and the like), travel time, vehicle speed, vehicle position, month, day and time data, and the like), average vehicle speed information, and the like is received from the navigation device 2, the CPU 11 can determine the rank A to rank D of the vehicle speed region 51D in the statistical traffic information per vehicle speed region 161 to 164 of the relevant road type from the link traveling information and the average vehicle speed information of the probe information, and update the link cost 51C corresponding to the time zone 51B of the relevant vehicle speed region 51D from the link ID and the day and time data included in the probe information.

Next, "route guidance processing" executed by the CPU 41 of the navigation device 2 and "statistical traffic information distribution processing" executed by the CPU 11 of the information distribution center 3 for distributing the statistical traffic information 16B to the navigation device 2 in the navigation system 1 will be explained based on FIG. 8 and FIG. 9.

Figure 8:
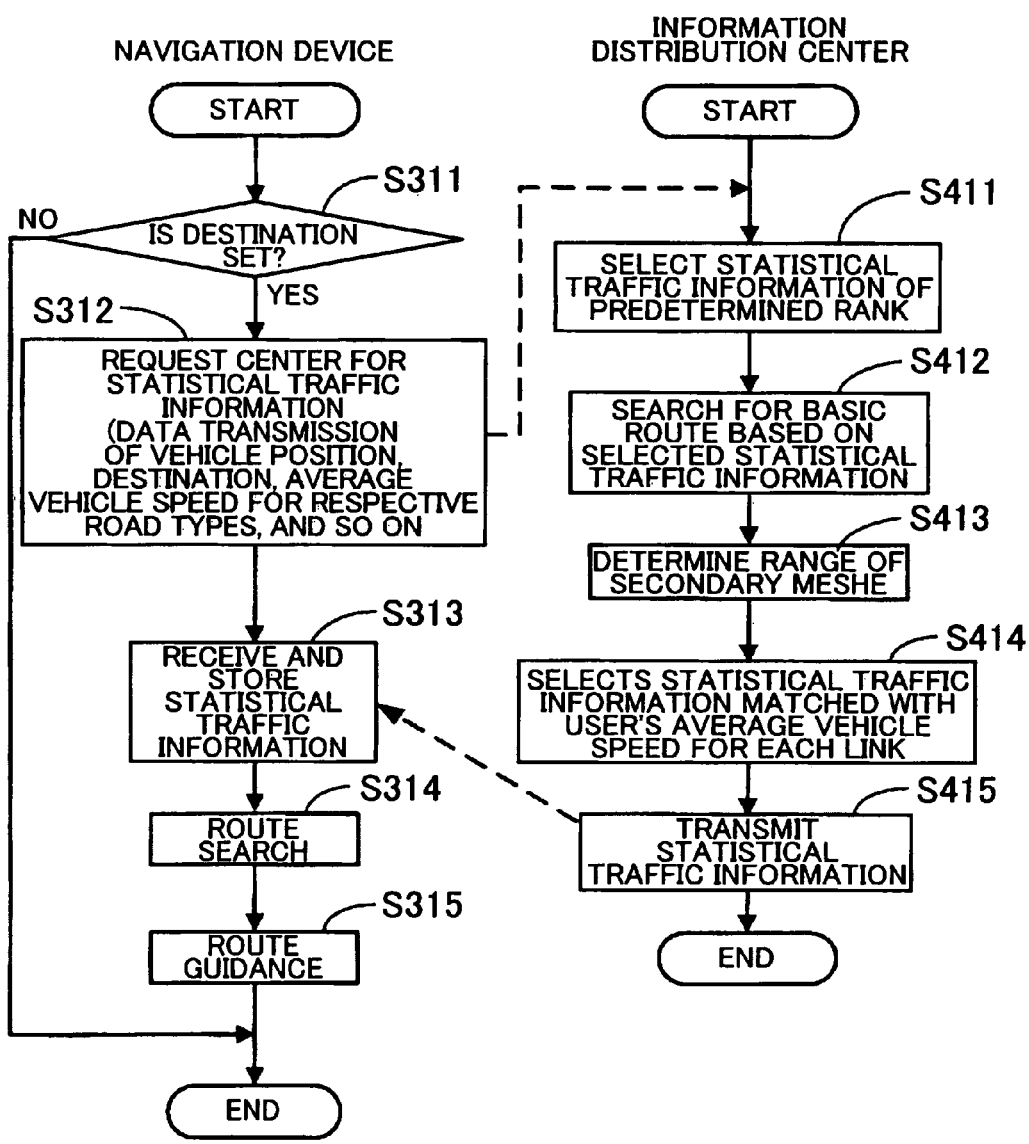
FIG. 8 is a flowchart showing "route guidance processing" executed by the CPU of the navigation device and "statistical traffic information distribution processing" executed by a CPU of the information distribution center for distributing statistical traffic information to the navigation device.

FIG. 8 is a flowchart showing the "route guidance processing" executed by the CPU 41 of the navigation device 2 and the "statistical traffic information distribution processing" executed by the CPU 11 of the information distribution center 3 for distributing the statistical traffic information 16B to the navigation device 2.

First, based on FIG. 8, the "route guidance processing" executed by the CPU 41 of the navigation device 2 will be explained. Note that the program shown by the flowchart of S311 to S315 in FIG. 8 is stored in the ROM 43 provided in the navigation device 2 and is executed by the CPU 41.

As shown in FIG. 8, first in S311, the CPU 41 executes determination processing of determining whether a destination is set or not by an input operation or the like with the operation portion 24 such as a touch panel or operation switches. Then when no destination is set (S311: NO), the CPU 41 ends the processing.

On the other hand, when it is determined that a destination is input (S311: YES), the CPU 41 temporarily stores coordinates and so on of the destination in the RAM 42 and thereafter proceeds to processing of S312.

In S312, the CPU 41 reads the "average vehicle speeds during uncongested road traveling" for respective road types from the average vehicle speed table 48 (refer to FIG. 4) stored in the traveling history DB 38, and stores them in the RAM 42 as average vehicle speed information to be transmitted to the information distribution center 3. Then, the CPU 41 transmits the navigation identification ID, coordinate data of the vehicle position, coordinate data of the destination, the average vehicle speed information, a route search condition, version information of the navigation map information 37A, and so on together with a request command requesting for the statistical traffic information 16B to the information distribution center 3.

Thereafter, in S313, the CPU 41 receives the statistical traffic information distributed from the information distribution center 3, and stores it in the statistical traffic information 36B of the navigation side traffic information DB 36.

Here, an example of a data structure of the statistical traffic information 36B will be explained based on FIG. 9. FIG. 9 is an explanatory diagram showing the example of the data structure of the statistical traffic information 36B stored in the navigation side traffic information DB 36.

Figure 9:
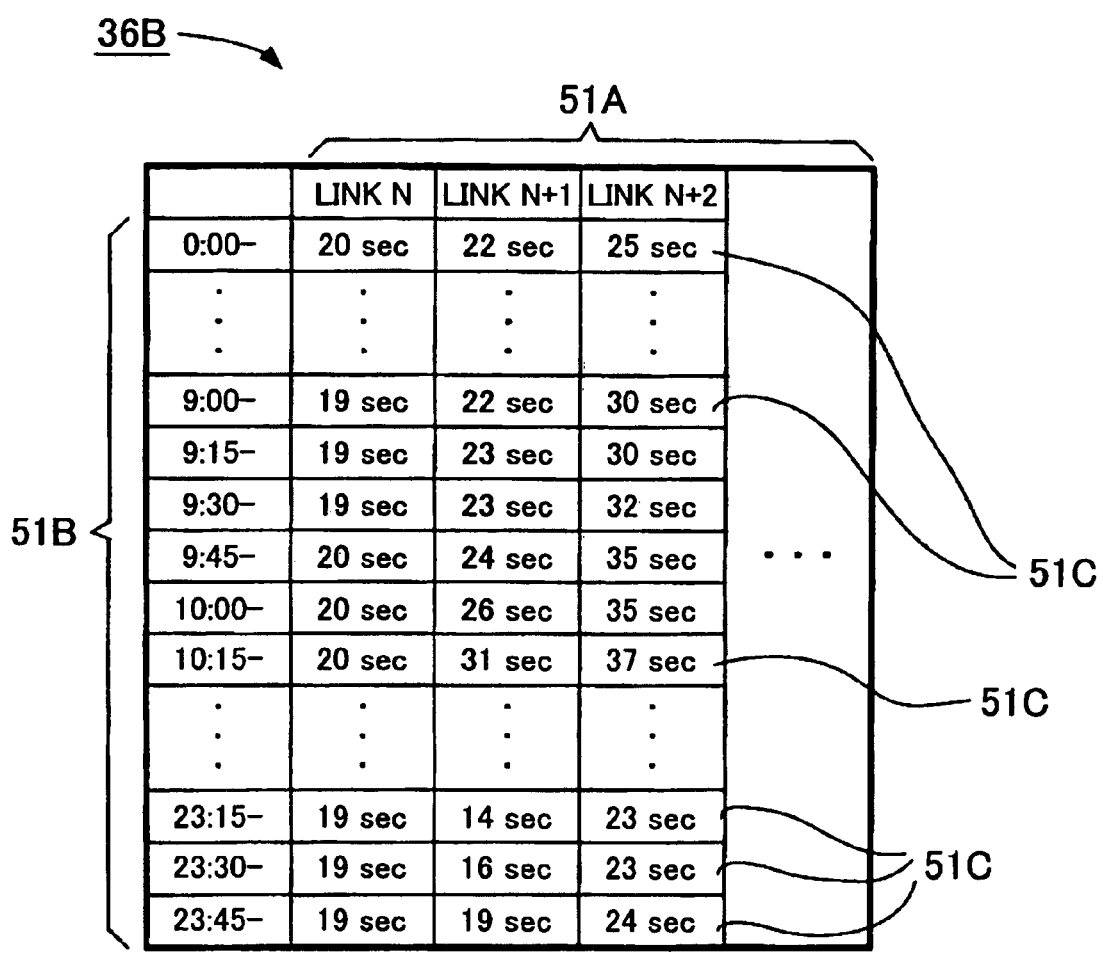
FIG. 9 is an explanatory diagram showing an example of a data structure of statistical traffic information stored in a navigation side traffic information DB.

As shown in FIG. 9, the statistical traffic information 36B is formed for each mesh ID added to each secondary mesh as an area for example, and has link costs 51C for the link ID 51A of each link for every time zone 51B. The time zones 51B are the time zones which are set for every 15 minutes (for example "0:00" to "0:14", or the like). Further, these link costs 51C are data each indicating an average required travel time when passing the link during a certain time zone 51B, and is shown as "20 (seconds)" or the like for example.

Subsequently, in S314, the CPU 41 searches for a recommended route from the current vehicle position to the destination by Dijkstra's algorithm or the like based on the statistical traffic information 36B and the navigation map information 37A, and stores it in the RAM 42.

Then, in S315, the CPU 41 performs a route guidance according to the recommended route and finishes the processing.

Next, the "statistical traffic information distribution processing" executed by the CPU 11 of the information distribution center 3 based on FIG. 8 will be explained. Note that the program shown by the flowchart of S411 to S415 in FIG. 8 is stored in the ROM 13 provided in the information distribution center 3, and is executed by the CPU 11 when a request command requesting for the statistical traffic information 16B is received from the navigation device 2.

First, in S411, the CPU 11 receives the vehicle information such as the navigation identification ID, the coordinate data of the vehicle position, the coordinate data of the destination, the average vehicle speed information, the route search condition, the version information of the navigation map information 37A, and so on together with the request command requesting for the statistical traffic information 16B transmitted from the navigation device 2 in above S312, and stores the vehicle information in the RAM 12. Then the CPU 11 selects, with respect to all the road types for each secondary mesh, statistical traffic information per vehicle speed region of a predetermined vehicle speed region 51D (for example, the statistical traffic information per vehicle speed region 162 in which the vehicle speed region 51D is rank B) from the statistical traffic information per vehicle speed region 161 to 164 constituting the statistical traffic information 16B.

Then, in S412, the CPU 11 searches by Dijkstra's algorithm or the like for a basic route to the destination according to the received search condition based on the update map information 14A corresponding to the version information of the navigation map information 37A stored in the center side map information DB 14 and the statistical traffic information per vehicle speed region (for example, the statistical traffic information per vehicle speed region 162 in which the vehicle speed region 51D is rank B) selected in above S411 for each secondary mesh, and stores it in the RAM 12.

Subsequently, in S413, the CPU 11 extracts the mesh IDs of all the secondary meshes through which the basic route searched in above S412 passes and stores them in the RAM 12, and determines the range of secondary meshes in which the statistical traffic information 16B to be transmitted to the navigation device 2 is selected.

Then, in S414, the CPU 11 sequentially reads the statistical traffic information per vehicle speed region 161 to 164, which are classified by road types, for each mesh ID of all the secondary meshes through which the basic route extracted in above S413 passes.

Further, the CPU 11 reads the "average vehicle speed during uncongested road traveling" for respective road types from the average vehicle speed information received from the navigation device 2, and identifies the vehicle speed regions 51D (rank A to rank D) corresponding to each received "average vehicle speed during uncongested road traveling" for respective road types received from the vehicle speed region determination table 50 stored in the center side traffic information DB 16. Thereafter, the CPU 11 reads, that is, selects the statistical traffic information per vehicle speed region corresponding to the vehicle speed regions 51D identified for respective road types from the statistical traffic information per vehicle speed region 161 to 164, which are classified by road types, for each mesh ID of all the secondary meshes through which the basic route passes, and stores them in the RAM 12 as statistical traffic information matched with the user's "average vehicle speeds during uncongested road traveling" for respective road types.

For example, in the case where the statistical traffic information per vehicle speed region 161 to 164 are included (refer to FIG. 7) in the statistical traffic information 16B of the "national expressway" corresponding to the mesh ID of the secondary mesh through which the basic route extracted in above S414 passes, and the "average vehicle speed during uncongested road traveling" corresponding to the "national expressway" of the average vehicle speed information received from the navigation device 2 is "79.5 km/h", the CPU 11 takes the "79.5 km/h" as the "user's average vehicle speed" corresponding to the "national expressway" of the vehicle speed region determination table 50 and identifies the vehicle speed region 51D as "rank A".

Then the CPU 11 reads from the statistical traffic information 16B, that is, selects from the statistical traffic information 16B the statistical traffic information per vehicle speed region 161 in which the vehicle speed region 51D is "rank A", and stores it in the RAM 12 as statistical traffic information of the "national expressway" of the relevant mesh ID to be transmitted to the user.

Subsequently, in S415, the CPU 11 distributes the statistical traffic information selected for the respective road types corresponding to the mesh IDs of all the secondary meshes through which the basic route stored in the RAM 12 in above S414 passes to the navigation device 2 corresponding to the navigation identification ID received in above S411, and ends the processing.

As has been explained in detail above, in the navigation system 1 according to the present embodiment, the CPU 41 of the navigation device 2 obtains link traveling information (link information (mesh ID, link ID, link length, presence of traffic signal, road type, and the like), travel time, vehicle speed, vehicle position, month, day and time data, and the like) when passing each link. Then, when the passed link is an uncongested road, the CPU 41 reads the road type and the vehicle speed of the link, and stores them in the traveling history DB 38 together with the day and time data (for example, year, month, day, day of the week, time, and the like). Further, the CPU 41 reads from the traveling history DB 38 vehicle speed data for a predetermined period (for example, for the past six months) corresponding to the road type of the link, and calculates the average value of these vehicle speed data. Then the CPU 41 stores and updates the calculated average value as the average vehicle speed during uncongested road traveling corresponding to the road type of the passed link in the average vehicle speed table 48 (refer to FIG. 4) stored in the traveling history DB 38 (S11 to S14).

Thus, it becomes possible to obtain average vehicle speed during uncongested road traveling in which the driver's driving characteristics for respective road types appear.

Further, in the navigation system 1, the CPU 41 of the navigation device 2 transmits to the information distribution center 3 at every predetermined time (for example, every five minutes) the probe information including the link traveling information for the passed link (link information (mesh ID, link ID, link length, presence of traffic signal, road type, and the like), travel time, vehicle speed, vehicle position, month, day and time data, and the like) and the average vehicle speed information including data of the "average vehicle speed during uncongested road traveling" in the average vehicle speed table 48 (S111 to S115).

On the other hand, when the probe information including the link traveling information (link information (mesh ID, link ID, link length, presence of traffic signal, road type, and the like), travel time, vehicle speed, vehicle position, month, day and time data, and the like) and the average vehicle speed information is received from the navigation device 2, the CPU 11 of the information distribution center 3 reads the road type corresponding to each link ID included in the probe information and the user's average vehicle speed during uncongested road traveling, and determines a vehicle speed region for each road type corresponding to the link ID from the vehicle speed region determination table 50 stored in the center side traffic information DB 16. Thereafter, the CPU 11 creates traffic information (mesh ID, link ID, road type, vehicle speed region, day and time data, and travel time) from the vehicle speed region and the probe information and stores them in the center side traffic information DB 16.

Then the CPU 11 reads traffic information in a certain period (for example, for the past six months) including matching link IDs, road types, vehicle speed regions and time zones to which day and time data belong from the traffic information stored in the center side traffic information DB 16, and statistically processes respective travel times to calculate a link cost 51C. Taking the link ID, road type, vehicle speed region and time zone to which the day and time data belongs of the traffic information as the link ID 51A, vehicle speed region 51D, and time zone 51B of the relevant road type of the statistical traffic information 16B, the CPU 11 substitutes them into the link cost 51C corresponding to them in the statistical traffic information 16B to update it (S211 to S215).

Thus, link costs 51C of each link ID 51A classified by road type can be created for each vehicle speed region 51D, and the "average vehicle speed during uncongested road traveling" for respective road types which varies according to the driver's driving characteristics can be reflected on the link costs 51C of each link ID 51A. That is, the average vehicle speed during uncongested road traveling for respective road types which varies according to the driver's driving characteristics can be reflected on the link costs 51C of each link ID 51A to create the statistical traffic information 16B of each link.

Further, in the navigation system 1, when a destination is set, the CPU 41 of the navigation device 2 transmits the navigation identification ID, coordinate data of the vehicle position, coordinate data of the destination, average vehicle speed information, a route search condition, version information of the navigation map information 37A, and so on together with a request command requesting for the statistical traffic information 16B to the information distribution center 3 (S311 to S312).

On the other hand, when a request command or the like requesting for the statistical traffic information 16B is received from the navigation device 2, the CPU 11 of the information distribution center 3 selects for each secondary mesh the statistical traffic information per vehicle speed region of a predetermined vehicle speed region 51D from the statistical traffic information per vehicle speed region 161 to 164 classified by road types constituting the statistical traffic information 16B. Then the CPU 11 searches for a basic route to the destination by Dijkstra's algorithm or the like based on the selected statistical traffic information per vehicle speed region and the update map information 14A according to the received search condition.

Subsequently, the CPU 11 sequentially reads the statistical traffic information per vehicle speed region 161 to 164 classified by road types for each mesh ID of all the secondary meshes through which the basic route passes. Further, the CPU 11 identifies a vehicle speed region 51D (rank A to rank D) for each road type from the average vehicle speed information received from the navigation device 2 and the vehicle speed region determination table 50 stored in the center side traffic information DB 16.

Thereafter, the CPU 11 selects the statistical traffic information per vehicle speed region corresponding to the identified vehicle speed region 51D of each road type from the statistical traffic information per vehicle speed region 161 to 164 classified by road types and distributes it to the navigation device 2 (S411 to S415).

Further, the CPU 41 of the navigation device 2 receives the statistical traffic information classified by road type distributed from the information distribution center 3 and stores it in the statistical traffic information 36B of the navigation side traffic information DB 36. Then the CPU 41 searches for a recommended route from the current vehicle position to the destination by Dijkstra's algorithm or the like based on the statistical traffic information 36B and the navigation map information 37A, and performs route guidance (S313 to S315).

Therefore, the CPU 41 of the navigation device 2 is able to obtain the statistical traffic information 36B corresponding to the average vehicle speeds during uncongested road traveling for respective road types on which the driver's driving characteristics are reflected. Thus, the CPU 41 is able to perform a route search considering the driver's characteristics.

Further, the CPU 11 of the information distribution center 3 selects statistical traffic information to be distributed to the navigation device 2 from the statistical traffic information 16B corresponding to secondary meshes through which the basic route passes, and thus it is possible to quickly select the statistical traffic information only in a necessary area to be distributed to the navigation device 2. Further, since the statistical traffic information to be distributed to the navigation device 2 is selected for the secondary meshes through which the basic route passes, it is possible to reduce the data amount of the statistical traffic information to be distributed to the navigation device 2.

It should be noted that the present invention is not limited to the above embodiment, and various improvements and modifications may occur insofar as they are within the scope of the present invention. For example, the followings are possible.

(A) For example, as shown in FIG. 2, the statistical traffic information 16B stored in the center side traffic information DB 16 and the vehicle speed region determination table 50 may be recorded together in the CD-ROM 7 to be supplied to the navigation device 2. Then when reading the map information from the CD-ROM 7 by the reading portion 28, the CPU 41 of the navigation device 2 may read the statistical traffic information 16B and store it in the statistical traffic information 36B of the navigation side traffic information DB 36, and may also read the vehicle speed region determination table 50 and store it in the navigation side traffic information DB 36, thereby updating them. Note that the CPU 41 executes the processing of above S11 to S14, and the average vehicle speed table 48 is stored in the traveling history DB 38.

Therefore, in this case, the data structure of the statistical traffic information 36B is generated for each mesh ID added to each secondary mesh similarly to the statistical traffic information 16B shown in FIG. 7 and classified by road type, and includes the statistical traffic information per vehicle speed region 161 to 164 classified by vehicle speed regions 51D of rank A to rank D. Further, the CPU 41 can determine the vehicle speed region 51D of each road type according to the user's "average vehicle speeds during uncongested road traveling" based on the vehicle speed region determination table 50 stored in the navigation side traffic information DB 36.

Here, an example of the "route guidance processing" executed by the CPU 41 of the thus structured navigation device 2 will be explained based on FIG. 10. FIG. 10 is a flowchart showing the example of the "route guidance processing" executed by the CPU 41 of the navigation device 2 in another embodiment.

As shown in FIG. 10, in S511, the CPU 41 executes determination processing of determining whether a destination is set or not by an input operation or the like with the operation portion 24 such as a touch panel or operation switches. Then, when destination is not set (S511: NO), the CPU 41 ends the processing.

On the other hand, when it is determined that a destination is inputted (S511: YES), the CPU 41 temporarily stores coordinates and so on of the destination in the RAM 42 and thereafter proceeds to processing of S512.

In S512, for each of secondary meshes matching with the "average vehicle speeds during uncongested road traveling" for respective road types stored in the average vehicle speed table 48, the CPU 41 generates statistical traffic information for navigation which is classified respectively by road types.

Specifically, the CPU 41 reads the "average vehicle speeds during uncongested road traveling" corresponding to the road types from the average vehicle speed table 48 stored in the traveling history DB 38. Then the CPU 41 identifies vehicle speed regions 51D (rank A to rank D) corresponding respectively to the "average vehicle speeds during uncongested road traveling" for the road types from the vehicle speed region determination table 50 stored in the navigation side traffic information DB 36.

Subsequently, for each mesh ID of all the secondary meshes, the CPU 41 sequentially reads the statistical traffic information per vehicle speed region 161 to 164 classified by road types, selects the statistical traffic information per vehicle speed region corresponding to the vehicle speed regions 51D identified for respective road types from the statistical traffic information per vehicle speed region 161 to 164, stores them sequentially as the statistical traffic information for navigation in the navigation side traffic information DB 36, and thereafter proceeds to S513.

In S513, the CPU 41 searches for a recommended route from the current vehicle position to the destination by Dijkstra's algorithm or the like based on the statistical traffic information for navigation and the navigation map information 37A stored in the navigation side traffic information DB 36, and stores it in the RAM 42.

Thereafter, in S514, the CPU 41 performs route guidance according to the recommended route and thereafter ends the processing.

Therefore, the CPU 41 of the navigation device 2 is able to generate the statistical traffic information for navigation corresponding to the average vehicle speeds during uncongested road traveling for respective road types on which the driver's driving characteristics are reflected. Further, the CPU 41 is able to perform a route search considering the driver's characteristics.

(B) Further, in above S115, the CPU 41 may read the road type corresponding to the link ID included in link traveling information from the navigation map information 37A, read only the "average vehicle speed during uncongested road traveling" for the road type corresponding to the road type of the link ID included in the link traveling information from the average vehicle speed table 48 (refer to FIG. 4), and may transmit the read "average vehicle speed during uncongested road traveling" and the link traveling information as probe information to the information distribution center 3. Accordingly, it is possible to reduce the amount of communicated data.

(C) Further, when destination is not set in above S311 (S311: NO), the CPU 41 reads the "average vehicle speed during uncongested road traveling" for respective road types from the average vehicle speed table 48 stored in the traveling history DB 38, and stores them in the RAM 42 as average vehicle speed information to be transmitted to the information distribution center 3. Then the CPU 41 may transmit the navigation identification ID, coordinate data of the vehicle position, the average vehicle speed information, and so on together with a request command requesting for statistical traffic information 16B of the surrounding area of the vehicle (for example, 50 km square with the vehicle position in the center, or the like) to the information distribution center 3.

Further, in this case, instead of above S412 and S413, the CPU 11 may extract mesh IDs of all the secondary meshes in the surrounding area of the vehicle position (for example, 50 km square with the vehicle position in the center, or the like) and store them in the RAM 12, determine the range of secondary meshes in which the statistical traffic information 16B to be transmitted to the navigation device 2 is selected, and thereafter execute the processing of above S414 and S415. Thus, the CPU 41 becomes capable of obtaining the latest statistical traffic information 36B corresponding to the "average vehicle speeds during uncongested road traveling" for respective road types on which the driver's driving characteristics are reflected regarding the surrounding area of the vehicle position.

(D) Further, after the CPU 11 of the information distribution center 3 executes the processing of above S414, the CPU 11 may execute the route search processing to the destination executed by the CPU 41 in above S314, and may transmit in above S415 route data of a searched recommended route to the navigation device 2. Thus, it is possible to reduce the processing load of the navigation device 2.

(E) Further, instead of above S412 to S413, the CPU 11 may designate all the secondary meshes as the range of secondary meshes in which the statistical traffic information 16B to be transmitted to the navigation device 2 is selected. Accordingly, the CPU 11 becomes capable of creating and distributing statistical traffic information according to the user's "average vehicle speeds during uncongested road traveling" for respective road types for all the secondary meshes. Further, the navigation device 2 becomes capable of obtaining statistical traffic information 36B corresponding to the average vehicle speeds during uncongested road traveling for respective road types on which the driver's driving characteristics are reflected regarding all the secondary meshes.

The invention claimed is:

1. A navigation system for use with a vehicle, the navigation system comprising:
   a memory; and
   a processor that:
      obtains an average vehicle speed of the vehicle for each of a plurality of road types and stores the average vehicle speed for each of the plurality of road types in the memory;
      receives input of a destination;
      based on the input destination and the stored average vehicle speed for each of the plurality of road types, requests traveling information from an information distribution center, the information distribution center storing traveling information for a plurality of links, where each of the plurality of links has a predicted traveling time for each of a plurality of vehicle speed categories, each vehicle speed categories being defined by a predetermined range of vehicle velocity;

receives traveling information from the information distribution center and stores the received traveling information in the memory, the received and stored traveling information including predicted traveling times for candidate links for a route to the destination, the predicted travel time for each candidate link corresponding to a vehicle speed category including the average vehicle speed of the vehicle for the road type corresponding to the candidate link;

searches for a route to the destination based on the stored traveling information; and provides route guidance based on a route found by the route search.

2. The navigation system according to claim 1, wherein:

the memory stores map information divided into a plurality of areas; and the processor searches for part of the route to the destination based on the stored map information and part of the route to the destination based on the stored traveling information.

3. The navigation system according to claim 1, wherein the obtained average vehicle speed is an average vehicle speed during uncongested road traveling.

4. The navigation system according to claim 2, wherein the obtained average vehicle speed is an average vehicle speed during uncongested road traveling.

5. A non-transitory computer-readable storage medium storing a computer-executable route search program, the program comprising:

instructions for obtaining an average vehicle speed of the vehicle for each of a plurality of road types and stores the average vehicle speed for each of the plurality of road types in the memory;

instructions for receiving input of a destination;

instructions for, based on the input destination and the stored average vehicle speed for each of the plurality of road types, requesting traveling information from an information distribution center, the information distribution center storing traveling information for a plurality of links, where each of the plurality of links has a predicted traveling time for each of a plurality of vehicle speed categories, each vehicle speed categories being defined by a predetermined range of vehicle velocity;

instructions for receiving traveling information from the information distribution center and stores the received traveling information in the memory, the received and stored traveling information including predicted traveling times for candidate links for a route to the destination, the predicted travel time for each candidate link corresponding to a vehicle speed category including the average vehicle speed of the vehicle for the road type corresponding to the candidate link;

instructions for searching for a route to the destination based on the stored traveling information; and instructions for providing route guidance based on a route found by the route search.

\* \* \* \* \*